United States Patent [19]

Oddo et al.

[11] Patent Number: 5,655,601

[45] Date of Patent: Aug. 12, 1997

US005655601A

[54] METHOD FOR SCALE INHIBITOR SQUEEZE APPLICATION TO GAS AND OIL WELLS

[75] Inventors: John E. Oddo; Amy T. Kan; Shiliang He, all of Houston, Tex.; Anthony J. Gerbino, Bloomfield, N.J.; Mason Tomson, Houston, Tex.

[73] Assignee: Gas Research Institute, Chicago, Ill.

[21] Appl. No.: 539,619

[22] Filed: Oct. 5, 1995

[51] Int. Cl.$^6$ .................................................. E21B 43/22
[52] U.S. Cl. ........................... 166/279; 166/307; 166/310
[58] Field of Search ................................ 166/279, 305.1, 166/307, 310, 371

[56] References Cited

U.S. PATENT DOCUMENTS

| | | | |
|---|---|---|---|
| 3,633,672 | 1/1972 | Smith et al. | 166/279 |
| 3,704,751 | 12/1972 | Tate | 166/307 |
| 4,213,934 | 7/1980 | Bellos et al. | 422/15 |
| 4,393,938 | 7/1983 | Lawson et al. | 166/279 |
| 4,485,874 | 12/1984 | Meyers | 166/279 |
| 4,495,996 | 1/1985 | Meyers et al. | 166/279 |
| 4,602,683 | 7/1986 | Meyers | 166/279 |
| 4,633,949 | 1/1987 | Crowe | 166/279 |
| 4,635,723 | 1/1987 | Spivey | 166/310 X |
| 4,860,829 | 8/1989 | Carlberg et al. | 166/279 |
| 4,947,934 | 8/1990 | Hen | 166/279 |
| 5,002,126 | 3/1991 | Carlberg et al. | 166/279 |
| 5,038,861 | 8/1991 | Shuler | 166/279 |
| 5,059,333 | 10/1991 | Hen | 166/279 X |
| 5,068,042 | 11/1991 | Hen . | |
| 5,099,924 | 3/1992 | Gidley | 166/307 |
| 5,141,655 | 8/1992 | Hen . | |
| 5,168,930 | 12/1992 | Wiseman et al. | 166/307 |
| 5,211,237 | 5/1993 | Faircloth et al. | 166/279 |
| 5,261,491 | 11/1993 | Stewart et al. | 166/279 |
| 5,263,539 | 11/1993 | Salimi et al. | 166/279 X |
| 5,346,009 | 9/1994 | Lawson et al. | 166/279 |
| 5,346,010 | 9/1994 | Adams et al. | 166/279 |
| 5,377,758 | 1/1995 | Fieler et al. | 166/279 |
| 5,409,062 | 4/1995 | Brown et al. | 166/279 |

*Primary Examiner*—George A. Suchfield
*Attorney, Agent, or Firm*—William M. Wesley; Phyllis Turner Brim; McAndrews, Held & Malloy, Ltd.

[57] ABSTRACT

A method for inhibiting scale formation in an oil or gas well is provided. Specifically, the method is a novel "squeeze" application. The squeeze comprises injecting three solutions into the oil or gas well: (1) the preflush solution, (2) the pill solution, and (3) the overflush solution. After the injection of the three solutions, the well is shut-in for about 24 to about 48 hours. The squeeze application is useful regardless of whether the mechanism for inhibitor fixation is adsorption or precipitation.

10 Claims, No Drawings

METHOD FOR SCALE INHIBITOR SQUEEZE APPLICATION TO GAS AND OIL WELLS

FIELD OF THE INVENTION

The present invention relates to a method for inhibiting scale formation in an oil or gas well. Specifically, the present invention relates to a novel method for performing a scale inhibitor squeeze in an oil or gas well.

BACKGROUND OF THE INVENTION

As gas and oil production progress in a given field or well, the ratio of produced hydrocarbon to produce salt water, or brine, increases. Also, water injection for pressure maintenance or secondary recovery procedures can cause large volumes of brine to be produced. In the continental United States it is estimated that, on average, between 15 and 20 barrels of brine are produced for every barrel of oil, or gas equivalent. One of the major problems associated with this produced brine is scale formation.

The three most common types of scale to form in the gas and oil industry are calcite, the calcium sulfates and barite. The present invention relates to controlling the formation of calcite scale.

Calcite crystals are composed mostly of calcium carbonate ($CaCO_3$), but often contain up to 20% of iron or magnesium carbonate. Although naturally occurring calcite, such as Iceland spar, is often essentially pure calcium carbonate, the scale formed from flowing brine generally contains several percent iron. This coprecipitated iron is often from corrosion products deeper in the well, but also can be the result of naturally occurring siderite or other materials in the production formation. Calcite scale formation is generally a consequence of the pressure drop that accompanies production. Simply put, this pressure drop removes carbon dioxide from solution and, because aqueous carbon dioxide is essentially carbonic acid, this removal of carbon dioxide increases the solution pH and causes calcite precipitation. Also, there is a secondary consequence of the pressure drop: the inherent solubility of calcite in salt water decreases as the pressure decreases. Both of these effects tend to cause calcite to precipitate during production.

Although scale can be eliminated by controlling flow rate, pressure, temperature, or by inducing precipitation or acid addition, these methods can negatively impact production and are generally less cost effective than using threshold chemical scale inhibitors. Threshold scale inhibitors are special chemicals which catalytically prevent solid particles from forming, even though the brine is sufficiently supersaturated with respect to calcite that scale formation would otherwise begin in minutes. These chemicals are referred to as "threshold" scale inhibitors because they prevent nucleation and scale formation at concentrations which are far too low to be effective by reacting with calcium ions in solution such as occurs with chelating agents. The most common methods of introducing threshold scale inhibitors to the oil or gas well are: (1) to "squeeze them into the oil or gas formation and then let them slowly release as production resumes, and (2) to continuously pump the threshold scale inhibitor into brine with a small metering pump.

Hundreds of proprietary chemicals in blends are available as threshold scale inhibitors. These proprietary chemicals are generally composed of materials which fall into one of three chemical classes: (1) low molecular weight polycarboxylates, including polyacrylates and polymaleates; (2) inorganic polyphosphates and phosphate esters; and (3) phosphonates. Each class of chemicals has properties which make certain materials desirable depending on specific conditions.

The notion of a scale inhibitor squeeze is to push or squeeze a solution containing scale inhibitor into the producing gas or oil well and fix the scale inhibitor in the producing formation. When production is resumed, the threshold scale inhibitor will be produced back in the water phase at a concentration sufficient to inhibit scale, in this case, calcium carbonate.

An ideal scale inhibitor squeeze would take no time to complete, require no equipment, have a zero chance of causing damage to the oil or gas formation, and the scale inhibitor in the first barrel of produced water produced after the squeeze would be at the optimum concentration to inhibit scale with no wasted scale inhibitor. Most importantly, the ideal scale inhibitor squeeze procedure would never have to be repeated. Short squeeze life requires the entire squeeze procedure to be repeated more often than is necessary, and over the life of a producing well, can result in tens of thousands to millions of wasted dollars. Research in recent years regarding inhibitor squeeze design has vastly improved effectiveness and lifetime.

Generally, a squeeze is performed and scale inhibitor flows back at low concentrations which increase and peak rapidly to some value and then decline within a few days to a plateau concentration which comprises the bulk of the squeeze duration. It is required that this plateau value is sufficient to inhibit scale. The more efficient the inhibitor in terms of active concentration, the more likely the plateau value will be acceptable and the longer the squeeze will last. Generally, squeeze designs consist of pumping three solutions—the preflush solution, the pill solution which contains the threshold scale inhibitor, and the overflush solution. In addition, it is usually desirable to shut-in the well for some time after the squeeze treatment to allow the threshold scale inhibitor to fix itself or equilibrate in formation.

There is little agreement in the art regarding the primary mechanism by which the threshold scale inhibitor fixes itself in the producing oil or gas well formation as a result of the squeeze procedure. The fixation mechanism of the threshold scale inhibitor determines the ultimate squeeze design. The source of disagreement in the art centers on whether the fundamental fixation mechanism of the threshold scale inhibitor is adsorption or precipitation. One school of thought considers that inhibitors are retained by adsorption onto the producing oil or gas well formation materials, thus when production is resumed after the squeeze procedure, the inhibitor desorbs into the produced water. A second school of thought considers that the threshold scale inhibitor is precipitated, probably as a complex calcium salt, in the oil or gas well during the squeeze, thus under this mechanism when production is resumed, the inhibitor is slowly dissolved into the produced water.

It is an object of this invention to provide a method for threshold scale inhibitor squeeze application in an oil or gas well that accommodates fixation of the threshold scale inhibitor in the gas well by either an adsorption mechanism or a precipitation mechanism.

This and other objects and advantages of the present invention are described, in and will be apparent from, the detailed description of the presently preferred embodiment discussed below.

SUMMARY OF THE INVENTION

The present invention provides a method for inhibiting scale formation in a gas or oil well formation, the method comprising:

a. Flushing the well with a first volume of a preflush solution, the preflush solution having a pH of about 5.0 or less;

b. Flushing the well with a second volume of a pill solution, the pill solution having a pH from about 1 to about 2, and comprising from about 0.5% to about 1% of a scale inhibitor or combination of a scale inhibitor.

c. Flushing the well with a third volume of an overflush solution, the overflush solution comprising filtered produced water; and d. Shutting in the well for a period from about 24 to about 48 hours.

The threshold scale inhibitor is squeezed into the oil or gas well formation in a relatively dilute solution, so that little threshold scale inhibitor is wasted by flowing back high concentrations of inhibitor during initial production after the squeeze application. Dilute solutions also accommodate both the precipitation and adsorption mechanisms.

DETAILED DESCRIPTION OF THE PREFERRED EMBODIMENT

As discussed above, the squeeze design consists of pumping three solutions into the oil or gas well formation. The preflush solution, the pill solution containing the threshold scale inhibitor, and the overflush solution.

A fundamental part of the squeeze design of this invention is the matrix of the background solution comprising the preflush, the pill, and the overflush. Although other background solutions can be used, as discussed below, preferably the background solution for the three squeeze design components is produced water from the well itself which has been filtered to remove particulate material. Because the produced water has been produced by the well itself, there is a minimal chance that components in the produced water will damage the well formation.

Because produced water will normally precipitate oxidized iron and other scale materials when stored on the surface, it is preferable to filter the produced water before use or to add a reducing agent, such as ammonium bisulfite, or to add acid or to add a chelating agent. Preferably, filtering of the produced water is done with a prefilter or mixed bed filter in line with a 2 to 20 micron mesh filter. Filtering is often required because fines must be removed from the produced water so that the solution will not plug the well formation during injection. Alternatively, a reducing agent is added to the produced water prior to surface storage to keep the iron in a reduced state and thereby avoid precipitation. Also, a chelating agent, for example ethylenediaminetetra acetic acid tetrasodium salt, can be added to the produced water to keep the heavy metals in solution. Other choices for the background solutions that will carry the squeeze components include a solution of potassium chloride, made-up brine, tap water, or seawater. The use of seawater as a background solution can cause some special problems due to the high sulfate concentration in seawater. However, seawater is suitable as a background solution in many applications.

Preferably, the preflush solution comprises about 1% hydrochloric acid, or less, in filtered produced water having a pH of about 5.0, or less. The amount of preflush solution required is variable depending upon the well formation and on the amount of scale presently formed. The volume of the preflush solution necessary to prepare the well for the injection of the pill solution will vary depending on the amount of presently formed scale.

The preflush solution is then followed by injection of the pill solution. The pill solution carries the threshold scale inhibitor into the gas or oil well formation. The injection of the scale inhibitor pill solution is the most important part of the squeeze design. The pill solution preferably comprises 0.5% to about 1% active threshold scale inhibitor and about 99% filtered produced water. Preferably, the pill solution is maintained at a pH from about 1.0 to about 2.0 pH units. The dilute solution of threshold scale inhibitor accommodates fixation of the scale inhibitor in the oil or gas well formation regardless of whether the primary fixation mechanism is by precipitation or by adsorption or both. The pH of the pill solution is maintained to between about 1 and about 2 pH units to maximize the fixation. Naturally occurring materials in the oil or gas well formation can react with the pill solution at low pH to neutralize the solution and liberate polyvalent cations that cause the fixation of the threshold scale inhibitor in the reservoir whether by adsorption or precipitation. Generally, threshold scale inhibitors are adsorbed better at low pH and will also precipitate with liberated polyvalent cations. The volume of pill solution required by the present invention is calculated according to the following formula:

$$\frac{\text{Number of Barrels}}{\text{of Pill Solution}} = \frac{0.324 \times BWPD}{\text{\% Active Scale Inhibitor in Pill Solution}} \times \frac{\text{Feet of Perforations in Squeeze Zone}}{\text{Total Feet of Perforations in Well}}$$

where BWPD is the number of barrels of produced water that the gas or oil well formation should produce per day when at full production. Preferably, the pill solution is injected into the oil or gas well formation as fast as possible.

The pill solution is then followed with an overflush solution injection. The overflush solution forces the inhibitor deeper into the oil or gas well formation and allows the threshold scale inhibitor to contact more surface area in the well. If any threshold scale inhibitor has precipitated close to the opening of the well, then the overflush solution will move the threshold scale inhibitor further back into the oil or gas well formation thereby maximizing the threshold scale inhibitor effectiveness. The overflush solution preferably comprises filtered produced water. The volume of the overflush solution is from about one to about three times the number of barrels of inhibitor pill solution injected. Importantly, the overflush solution should be injected into the oil or gas well formation as quickly as possible. In a relatively tight formation nitrogen, or some other gas, can be used to displace the pill solution.

Finally, the well should be preferably shut-in for at least from about 24 to about 48 hours. This shut-in period is required because of the slow kinetics associated with adsorption and/or to allow the threshold scale inhibitor to precipitate.

While particular elements, embodiments, and applications of the present have been described, it will be understood, of course, that the invention is not limited thereto, since modifications may be made by those skilled in the art, particularly in light of the foregoing teachings. It is therefore contemplated by the appended claims to cover such modifications as incorporate those features which would come within the spirit and scope of the invention.

What is claimed is:

1. A method for inhibiting scale formation in a gas or oil well, the method comprising:

a. flushing a well with a first volume of a preflush solution, the preflush solution having a pH of about 5.0 or less;

b. flushing the well with a second volume of a pill solution, the pill solution having a pH from about 1 to about 2 pH units, and comprising from about 0.5% to about 1% active concentration of a threshold scale inhibitor or combination of threshold inhibitors;

c. flushing the well with a third volume of an overflush solution, the overflush comprising filtered produced water; and d. shutting in the well for a period from about 24 to about 48 hours.

2. The method according to claim 1, wherein the preflush solution comprises hydrochloric acid and filtered produced water.

3. The method according to claim 2, wherein the preflush solution comprises about 1% or less hydrochloric acid, by volume.

4. The method according to claim 3, wherein the preflush solution comprises about 99%, by volume, filtered produced water.

5. The method according to claim 1, wherein the preflush solution comprises about 1% or less, by volume, of ethylenediaminetetra acetic acid tetrasodium salt and about 99%, by volume, filtered produced water.

6. The method according to claim 1, wherein the preflush solution comprises about 1% or less, by volume, of ethylenediaminetetra acetic acid tetrasodium salt, about 2%, by volume, potassium chloride and about 97%, by volume, water.

7. The method according to claim 1, wherein the second volume is calculated according to the following formula:

$$\text{Number of Barrels of Pill Solution} = \frac{0.324 \times BWPD}{\% \text{ Active Scale Inhibitor in Pill Solution}} \times \frac{\text{Feet of Perforations in Squeeze Zone}}{\text{Total Feet of Perforations in Well}}$$

wherein BWPD is the number of barrels of water the gas or oil well produces per day at full production without scale formation.

8. The method according to claim 1, wherein the third volume is three times the second volume.

9. The method of claim 1, wherein the threshold scale inhibitor comprises polyacrylates, polymaleates, inorganic polyphosphates, polyphosphate esters, phosphonates or mixtures thereof.

10. The method according to claim 1, wherein the first volume of preflush solution has a pH of about 1.0 to about 5.0.

* * * * *